US011936747B2

(12) United States Patent
Ray et al.

(10) Patent No.: US 11,936,747 B2
(45) Date of Patent: *Mar. 19, 2024

(54) CLOUD-BASED COMPOSABLE DATA LAYER

(71) Applicant: Microsoft Technology Licensing, LLC, Redmond, WA (US)

(72) Inventors: Aninda Ray, Sammamish, WA (US); Dmitriy Meyerzon, Bellevue, WA (US); Knut Kristian Johansen, Tromsdalen (NO); Ryan Antoine Nakhoul, Issaquah, WA (US); Nikita Voronkov, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 23 days.

This patent is subject to a terminal disclaimer.

(21) Appl. No.: 17/857,890

(22) Filed: Jul. 5, 2022

(65) Prior Publication Data

US 2022/0337671 A1 Oct. 20, 2022

Related U.S. Application Data

(63) Continuation of application No. 16/138,096, filed on Sep. 21, 2018, now Pat. No. 11,418,621.

(51) Int. Cl.
*H04L 67/00* (2022.01)
*G06F 9/445* (2018.01)
(Continued)

(52) U.S. Cl.
CPC .......... *H04L 67/34* (2013.01); *G06F 9/44526* (2013.01); *H04L 67/141* (2013.01); *H04L 67/60* (2022.05); *H04L 67/75* (2022.05)

(58) Field of Classification Search
CPC ......... H04L 67/34; H04L 67/60; H04L 67/75; H04L 67/141; G06F 9/44526
(Continued)

(56) References Cited

U.S. PATENT DOCUMENTS

| 6,141,686 A * | 10/2000 | Jackowski | ............ H04L 41/065 709/224 |
| 2005/0251809 A1* | 11/2005 | Gunduc | ..................... G06F 9/54 719/310 |

(Continued)

OTHER PUBLICATIONS

Klaus Nygard, Single page architecture as basis for web applications, Jun. 6, 2015, School of Science, Aalto University (Year: 2015).*

(Continued)

*Primary Examiner* — Wing F Chan
*Assistant Examiner* — John Fan
(74) *Attorney, Agent, or Firm* — NovoTechIP International PLLC

(57) ABSTRACT

Techniques for establishing a network connection with a client device and responding to composite requests from the client device. For a composite request identifying a first action associated with a first data plugin component and a second action associated with a different second data plugin component, the first action is performed by executing a first portion of the data plugin component and transmitting corresponding response data in a first transmission to the client device via the network connection, and the second action is performed by executing a second portion of the data plugin component and transmitting corresponding response data in a second transmission separate from the first transmission to the client device via the network connection.

18 Claims, 9 Drawing Sheets

(51) Int. Cl.
   *H04L 67/141* (2022.01)
   *H04L 67/60* (2022.01)
   *H04L 67/75* (2022.01)
(58) Field of Classification Search
   USPC .......................................................... 709/228
   See application file for complete search history.

(56) References Cited

U.S. PATENT DOCUMENTS

| | | | | |
|---|---|---|---|---|
| 2008/0294854 | A1* | 11/2008 | Schneider | G06F 3/0683 711/E12.002 |
| 2013/0166692 | A1* | 6/2013 | Tjin | G06F 16/4387 709/219 |
| 2015/0312176 | A1* | 10/2015 | Jones | H04L 67/10 709/206 |
| 2019/0363899 | A1* | 11/2019 | Christian | H04L 65/611 |

OTHER PUBLICATIONS

"Chunked Transfer Encoding", Retrieved From: https://en.wikipedia.org/wiki/Chunked_transfer_encoding, Dec. 6, 2022, 3 Pages.
"Office Action Issued in European Patent Application No. 19740153.2", dated Jan. 20, 2023, 9 Pages.
Ma, et al., "MASA: A Cross-Platform Component Architecture for Building Mobile Applications with Service Caching", In Proceedings of IEEE 13th International Conference on e-Business Engineering, Nov. 4, 2016, pp. 264-269.
Smith, et al., "Microservices—From Design to Deployment", Retrieved From: https://www.nginx.com/blog/microservices-from-design-to-deployment-ebook-nginx/, May 18, 2016, 4 Pages.
"Office Action Issued in India Patent Application No. 202147011351", dated Nov. 25, 2022, 8 Pages.
"Office Action Issued in India Patent Application No. 202147011371", dated Nov. 16, 2022, 7 Pages.
"Office Action Issued in European Patent Application No. 19746210.4", dated Aug. 17, 2022, 8 Pages.
"Single-page application", Retrieved From: https://en.wikipedia.org/w/index.php?title=Single_page_application&oldid=827561153, Feb. 25, 2018, pp. 1-9.
"Summons to Attend Oral Proceedings Issued in European Patent Application No. 19740153.2", dated Nov. 16, 2023, 10 Pages.
NGOC, HUNGH., "Single Page Web Appplication with Restful API and AngularJS: Best practices with Verto Monitor", In Thesis of Bachelor of Engineering, Degree Programme in Media Engineering, Helsinki Metropolia University of Applied Sciences, Nov. 1, 2014, 50 Pages.
U.S. Appl. No. 10/839,037, filed Nov. 17, 2020.

* cited by examiner

CLOUD-BASED COMPOSABLE DATA LAYER

CROSS-REFERENCE TO RELATED APPLICATION

This application is a continuation of copending U.S. patent application Ser. No. 16/138,096, filed Sep. 21, 2018, which is incorporated by reference herein in its entirety. This application is also related to commonly-owned U.S. patent application Ser. No. 16/138,116, filed Sep. 21, 2018, now U.S. Pat. No. 10,839,037, issued Nov. 17, 2020, which is also incorporated by reference herein in its entirety.

BACKGROUND

For web applications, single-page application designs feature not performing new browser page loads as users interact with them. Once a user is within an SPA, this design paradigm provides a very responsive experience, with a low end user perceived latency (EUPL). However, there is a heavy up-front cost involved starting an SPA or changing from one SPA to another including for downloading a substantial framework and other code resources, retrieving data from services used to generate an initial view, and executing the code resources, including processing the service-originated data and rendering a corresponding view. This results in a somewhat significant delay in starting an SPA, which substantially increases the EUPL. A conventional solution involves adding more and more (and increasingly disparate) functionality to an SPA, resulting in a large monolithic application resulting in unwanted dependencies in software development and management, and increased size and memory consumption for the larger application.

SUMMARY

A system for interacting with one or more remote client devices, in accord with a first aspect of this disclosure, the system including one or more processors and one or more machine-readable media storing instructions which, when executed by the one or more processors, cause the one or more processors to establish a first network connection with a first client device, and identify, for a first application, a first plurality of data plugin components each configured to provide access to one or more computer-implemented services, wherein the first plurality of data plugin components includes a first data plugin component and a different second data plugin component. The instructions also cause the one or more processors to receive a first composite request from the first client device via the first network connection, the first composite request identifying a first plurality of actions, including a first action associated with the first data plugin component and a second action associated with the second data plugin component. In addition, the instructions further cause the one or more processors to, in response to determining that the first composite request identifies the first action, perform the first action by executing a portion of the first data plugin component to perform a first transaction with a first computer-implemented service and obtain a first response data based on the first transaction, and transmit, in a first transmission and in response to the first composite request, the first response data to the first client device via the first network connection. The instructions further cause the one or more processors to, in response to determining that the first composite request identifies the second action, perform the second action by executing a portion of the second data plugin component to perform a second transaction with a second computer-implemented service and obtain a second response data based on the second transaction, wherein the second computer-implemented service is different than the first computer-implemented service, and transmit, in a second transmission separate from the first transmission and in response to the first composite request, the second response data to the first client device via the first network connection.

A method for interacting with one or more remote client devices, in accord with a second aspect of this disclosure, the method including establishing a first network connection with a first client device, and identifying, for a first application, a first plurality of data plugin components each configured to provide access to one or more computer-implemented services, wherein the first plurality of data plugin components includes a first data plugin component and a different second data plugin component. The method also includes receiving a first composite request from the first client device via the first network connection, the first composite request identifying a first plurality of actions, including a first action associated with the first data plugin component and a second action associated with the second data plugin component. In addition, the method includes, in response to determining that the first composite request identifies the first action, performing the first action by executing a portion of the first data plugin component to perform a first transaction with a first computer-implemented service and obtain a first response data based on the first transaction, and transmitting, in a first transmission and in response to the first composite request, the first response data to the first client device via the first network connection. The method further includes, in response to determining that the first composite request identifies the second action, performing the second action by executing a portion of the second data plugin component to perform a second transaction with a second computer-implemented service and obtain a second response data based on the second transaction, wherein the second computer-implemented service is different than the first computer-implemented service, and transmitting, in a second transmission separate from the first transmission and in response to the first composite request, the second response data to the first client device via the first network connection.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles unless expressly indicated.

Figure 1:
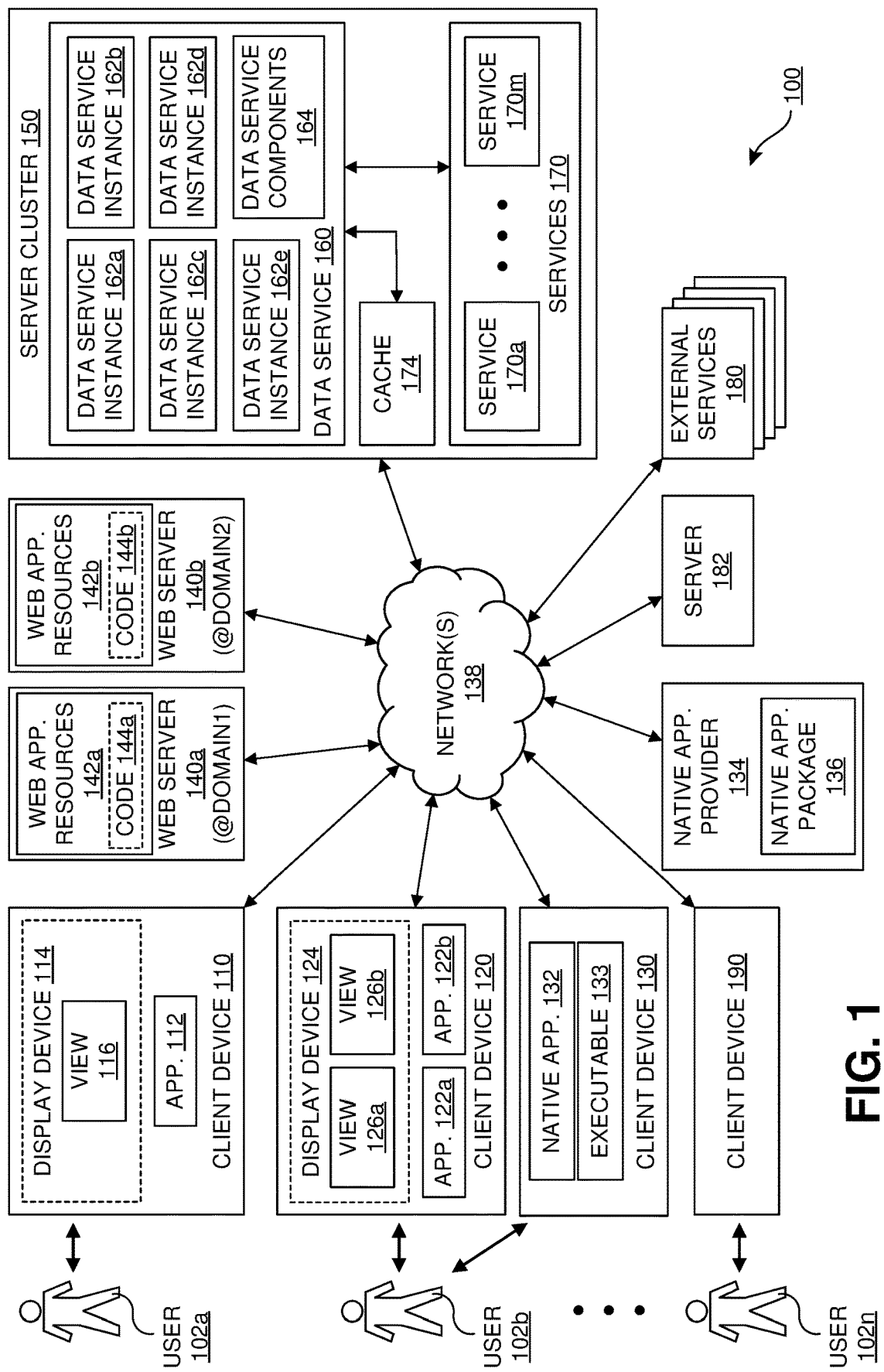
FIG. 1 illustrates an example system in which various client devices make use of a data service for transacting with various computer-implemented services.

FIG. 1 illustrates an example system 100 in which various client devices 110, 120, 130, and 190 make use of a data service 160 for transacting with various computer-implemented services 170 and 180. In FIG. 1, a client device 110 is being used by a first user 102a. The client device 110 is executing a first application instance 112 (which may be simply referred to as an "application" and is abbreviated as "APP." in FIG. 1) of a first application, and the first user 102a is interacting with the first application instance 112 via a view 116 presented to the first user 102a via a display device 114. The display device 114 may be referred to as a "display." In some examples, the display device 114 is included in the client device 110, and in some examples, the display device 114 is communicatively coupled to client device 110. The first application instance 112 causes the view 116 to be rendered for display to the first user 102a. For the purpose of discussion, other aspects of the client device 110 are not illustrated in FIG. 1; examples of such aspects of the client device 110 are described below in connection with FIGS. 8 and 9. In some examples, the first user 102a is associated with the client device 110 and/or the first application instance 112. The first application instance 112 is configured to establish, and has established, a first network connection (not shown in FIG. 1) via one or more data communication network(s) 138 with a data service 160 to utilize various computer-implemented services, such as one or more services 170 and/or external services 180.

In some implementations, the first application instance 112 is an instance of a first web application being executed within an execution environment provided by a web browser application (not shown in FIG. 1) or a similar execution environment. Example web browser applications include, but are not limited to, the Edge browser by Microsoft, the Firefox browser (mobile or desktop) by Mozilla, the Safari browser (mobile or desktop) by Apple, and the Chrome browser (mobile or desktop) by Google. By way of example, the web browser application may establish one or more network connections with a web server 140a via one or more network(s) 138, retrieve web application resources 142a, including code resources 144a (such as, but not limited to, HTML, JavaScript, WebAssembly, and/or CSS resources) from the web server 140a, and execute the retrieved web application resources 142a as the first application instance 112. The web browser application may provide a canvas, which may be provided in connection with a tab or window presented via the display device 114, for rendering the view 116. In some examples, the first application instance 112 is a web application implemented as a single-page application (SPA).

A second user 102b is making use of both a client device 120 and a client device 130. The client device 120 is executing a second application instance 122a and a third application instance 122b, which present respective views 126a and 126b via a display device 124. The client device 120, display 124, first and second application instances 122a and 122b, and views 126a and 126b may be configured much as described for the client device 110, display 114, first application instance 112, and view 116. The second application instance 122a is configured to establish, and has established, a second network connection with the data service 160, and the second application instance 122b is configured to establish, and has established, a third network connection, different than the first network connection, with the data service 160.

In some examples, the second application instance 122a and/or the third application instance are web applications, as discussed for the first application instance 112. In some example, a single web browser application instance may provide a first tab and/or window associated with the second application instance 122a and a second tab and/or window, different than the first tab and/or window, associated with the third application instance 122b. In some examples, the second and third application instances 122a and 122b are for a same web application; for example, the second user 102b may concurrently use multiple tabs and/windows for the same web application, resulting in respective application instances and respective network connections with the data service 160. In examples in which the second and third application instances 122a and 122b are concurrently executing within a single web browser application instance, the second and third application instances 122a and 122b are considered separate application instances in this description.

In some examples, a web browser application connects, at a first domain (labeled "@DOMAIN1" in FIG. 1) to a first web server 140a to retrieve code resources 144a to execute the second application instance 122a, and a web browser application connects, at a second domain (labeled "@DOMAIN2 in FIG. 1) different than the first domain, to retrieve different code resources 144b to execute the third application instance 122b. For example, the web browser is provided a domain name, such as "www.foo.net", for the first domain, which is resolved via the Domain Name System (DNS) to a network address to which the web browser can connect to transact with the first web server 140a. The first and second domains are considered different "origins" by the web browser application, resulting in certain browser-enforced limitations on interactions between the second and third application instances 122a and 122b. Similarly, the first user 102a may cause a web browser tab or window to transition from the first application instance 112 to a different web application served from a different domain.

The client device 130 is executing a native application instance 132 of a native application that is configured to connect to establish, and has established, a fourth network connection (not shown in FIG. 1) via one or more network(s) 138 with the data service 160. In some examples, the client device 130 may utilize a display device to present a view for the native application instance 132, similar to the display device 114 and view 116 of the client device 110. However, in some examples, the native application instance 132 is not configured to make use of such a display device. Rather than being configured to be downloaded by a web browser application for execution within an execution environment provided by the web browser application, executable resources 133 for the native application are configured to be installed in, and retrieved from, a storage unit included in the client device 130. The executable resources 133 for a native application may include, but are not limited to, one or more precompiled program modules in machine language, interpreted code (for example, code written in the Python programing language), and/or bytecode. In some examples, the native application is obtained, via network(s) 138, from a native application provider 134 as a native application package 136. In some examples, the native application provider 134 is implemented as an "app store," such as, but not limited to, Microsoft Store, Google Play (for Android or Chrome OS platforms), and Apple App Store (for iOS platforms). In some examples, the native application package 136 may be provided in a software installer package file format, such as, but not limited to, an APK file for Android, a PKG file for iOS, an RPM file for Fedora Linux, and an MSI file for Windows Installer. In some examples, client devices 110, 120, 130, and/or 190 can execute both web applications and native applications.

A third user 102n is making use of a client device 190, which is described in FIG. 2 and later figures. The client devices 110, 120, 130, and/or 190 may also be referred to as "client computing devices," and are only illustrative embodiments.

In the example shown in FIG. 1, a server cluster 150, in which multiple computer processors are operated in a "cloud computing" environment or as a "software as a service" (SaaS), is configured to provide the data service 160. In some examples, as illustrated in FIG. 1, the server cluster 150 is configured to provide a cache 174 used by the data service 160 and/or computer-implemented services 170 (which may simply be referred to as "services") with which the data service 160 performs transactions. The Microsoft Azure cloud computing service or other cloud computing services, for example, are suitable platforms for the server cluster 150.

The data service 160 provides services to remote client devices, such as client devices 110, 120, 130, and 190 shown in FIG. 1, for utilizing various computer-implemented services, such as one or more services 170 and/or external services 180, according to a consistent interface for client devices. In the example illustrated in FIG. 1, the data service 160 is configured to receive network connections from application instances on remote client devices via network (s) 138 and instantiate an individual data service instance (such as data service instance 162a) for each established network connection to service client transactions. In the example shown in FIG. 1, there are individual network connections between application instance 112 and data service instance 162a, between application instance 122a and data service instance 162b, between application instance 122b and data service instance 162c, between native application instance 132 and data service instance 162d, and between the client device 190 and data service instance 162e. In some examples, the data service instances 162a, 162b, 162c, 162d, and 162e are operated in respective virtual machines executing a virtual machine image included in the data service components 164, thereby providing isolation and protection. Such virtual machines may be implemented using, for example, hypervisor-based virtualization and/or container-based virtualization.

In some examples, as shown in FIG. 1, there may be one more external computer-implemented services 180 not implemented within the server cluster 150, with which the data service 160 may perform transactions much as with the services 170, but via the network(s) 138. In some examples, the server cluster 150 may be managed by a first party while an external service 180 is managed by a different party. In some examples, as shown in FIG. 1, a server computer system 182 may be configured to, via network(s) 138, make use of data service 160.

Although FIG. 1 illustrates only a single instance of native application provider 134, data service 160, cache 174, external service 180, and server 182, in some examples there may be multiple instances of one or more of these elements. Likewise, additional web servers, similar to web servers 140a and 140b, may be provided.

Figure 2:
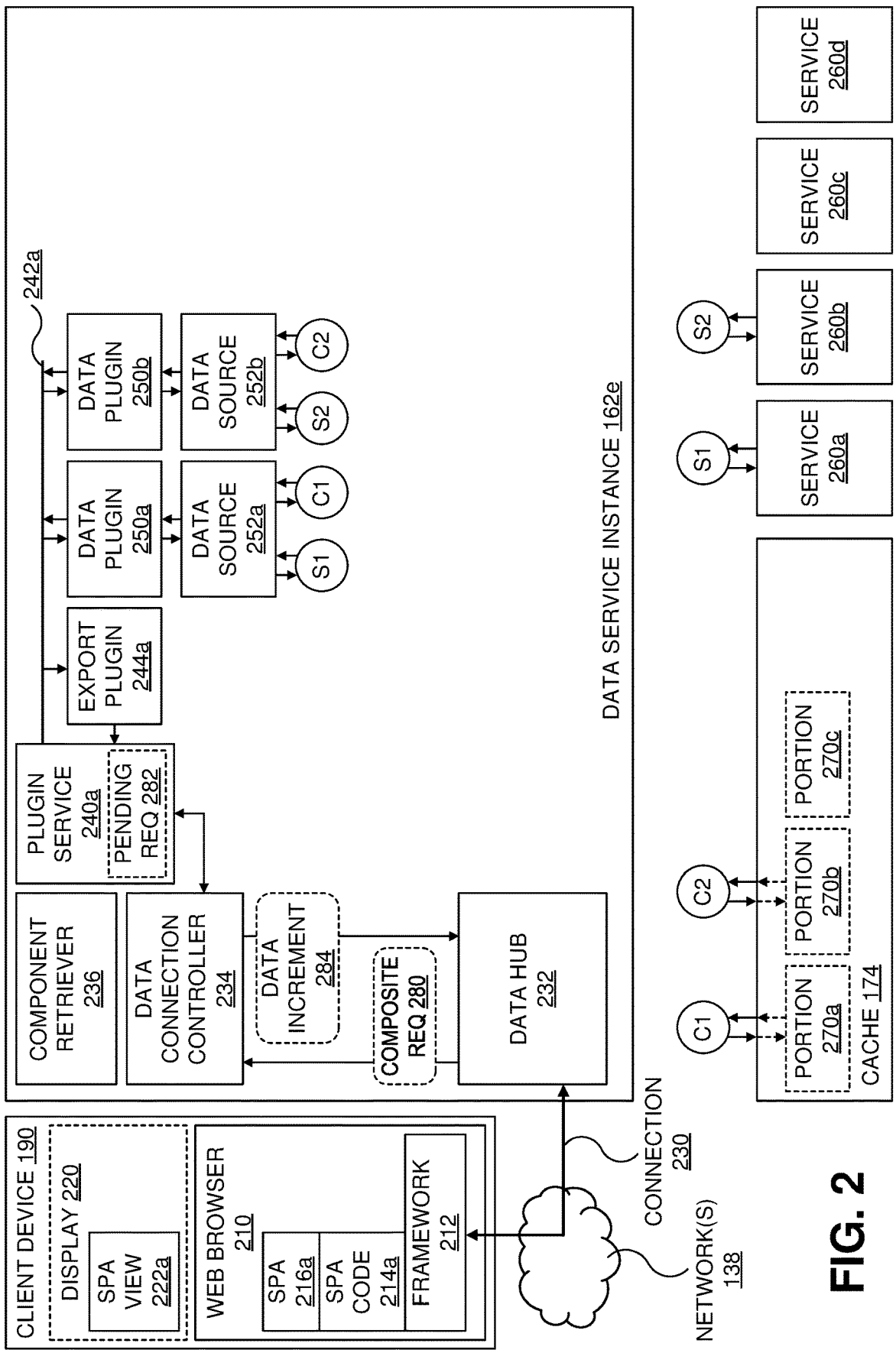
FIG. 2 illustrates an example of interaction between a client device and a respective data service instance provided by the data service shown in FIG. 1.

FIG. 2 illustrates an example of interaction between a client device 190 and a respective data service instance 162e provided by the data service 160 shown in FIG. 1. The client device 190 may include any of the features described for the client devices 110, 120, and 130, and any of the features described for the client device 190 may be included in client device 110, client device 120, and/or client device 130. It is noted that although the examples in FIGS. 2-7 are discussed with respect to single-page applications executing within web browser applications, the described techniques may also be applied for providing access to computer-implemented services to multi-page web applications executed within web browser applications, native applications (such as native application 132 in FIG. 1), other network-capable applications, and server systems such as server 182 in FIG. 1.

In FIG. 2, the client device 190 is executing a web browser application instance 210, much as described for client devices 110 and 120 in FIG. 1. A first single-page application (SPA) instance 216a is executing within the web browser application instance 210, and has a corresponding first view 222a presented to the user 102n via a display device 220. To execute the first SPA instance 216a, the web browser application instance 210 retrieves a framework 212 and first SPA code resources 214a configured to implement the first SPA instance 216a using the framework 212. The framework 214 and the first SPA code resources 214a each include code executable by the web browser application instance 210, such as, for example, HTML, scripts (for example, in accordance with the JavaScript language), and/or binary instructions (for example, in the form of WebAssembly modules). The first SPA code resources 214a control rendering of the first SPA view 222a (for example, generating a user interface (UI) comprising selected UI elements), actions performed via the data service instance 162e in response to events including user input events, and rerender the page in response to new data. The framework 212 provides code resources for establishing network connections with the data service 160, maintaining such network connection, serializing and transmitting action requests (including associated data) to the data service 160, receiving and deserializing data from the data service 160, and communicating application and connection states to the first SPA instance 216a and the data service 160. In some implementations, the first SPA instance 216a is configured to generate an initial view based on data retrieved from the data service instance 162e, perform transactions with one or more computer-implemented services via the data service instance 162e in response to detected user interaction with the first SPA view 222a, and modify portions of the first SPA view 222a in response to data received from the data service instance 162e.

In FIG. 2, the framework 212 has established a network connection 230 with the data service instance 162e via the data service 160. Through interaction between the framework 212 and a data hub component 232 (which may be referred to as a "data hub"), a persistent network connection is maintained. In this example, the network connection 230 is maintained until a tab or window for the first SPA instance 216a experiences a page reload, experiences a page load (for example, as a result of navigating to a new origin), or is closed. In some examples, this network connection is implemented using an ASP.NET SignalR connection. In some examples, the network connection may remain established despite an interruption in an underlying transport connection that is automatically reestablished; for example, according to the logic by which a SignalR connection ID is persisted. In some examples, this network connection is implemented using a WebSocket connection (for example, SignalR with WebSocket transport) for low-latency bidirectional communication of data and messages between the first SPA instance 216a and the data service instance 162e. By implementing network connection management features in the framework 212, the first SPA code resources 214a are simplified and obtain a robust communication channel with the data service 160. In some examples, as part of establishing the network connection 230, the framework 212 and/or the first SPA instance 218a may authenticate with the data service 160 and/or one or more computer-implemented services with which the data service instance 162e will transact.

In response to establishing the network connection 230, a data connection controller component 234 (which may be referred to as a "data connection controller") is instantiated for the network connection 230. The data connection controller 234 is configured to respond to plugin service management request messages received via the connection 230. A "request message" may also be referred to as a "request." For example, as part of an initialization phase for the first SPA instance 216a, the first SPA instance 216a may issue a "create plugin service" request message, in response to which the data connection controller 234 instantiates a plugin service component 240a (which may be referred to as a "plugin service"). In some examples, the "create plugin service" request message includes an application identifier, and the data connection controller 234 to only instantiate a single plugin service for the application identifier. In some implementations, a generic plugin service component is used for each plugin service instance, and application-specific logic in data plugin components and/or data source components.

In some examples, the "create plugin service" request message may include a software version identifier to indicate a particular version of the plugin service component 240a to retrieve and instantiate. The software version identifier allows control over code components that are instantiated for various deployments, such as for development, testing, and/or production. In some implementations, the data connection controller 234 utilizes a component retriever 236, configured to selectively retrieve components for dynamic instantiation, such as plugin service components, plugin components, and data source components for instantiation in association with an SPA instance. The component retriever 236 may be configured to retrieve such components from a local storage included in the data service instance 162e (if deployed to that storage), from the data service components 164 maintained by the data service 160 (if deployed there), or elsewhere, and may be configured to select a version of a component based on a provided software version identifier.

The data connection controller 234 is also configured to route plugin service request messages (request messages executed by a plugin service) and data plugin request messages (request messages indicating actions to be executed by plugins, such as data plugin 250a shown in FIG. 2) received via the connection 230 to an associated plugin service. In some examples, an application identifier or plugin service identifier, unique to each plugin service instantiated by the data service instance 162e, is associated with each plugin service, an application identifier or plugin service identifier is included in plugin service request messages and plugin request messages, and the data connection controller 234 is configured to route a received request message to the plugin service associated with an application identifier or plugin service identifier included in the received request message.

In some implementations, the plugin service 240a is configured to, in response to a received "create plugin" plugin service request message identifying a selected plugin (such as an export plugin 244a or a data plugin 250a), instantiate a plugin component corresponding to the identified plugin. In some examples, "create plugin" plugin service request message includes one or more configuration parameters to be applied by the instantiated plugin as part of an initialization phase of the plugin or for one or more actions performed by the plugin. In some examples, the first SPA instance 216a is configured to, as part of the initialization phase for the first SPA instance 216a, issue one or more "create plugin" request messages to instantiate plugins for performing transactions with selected services. In some examples, one or more data plugin components may be identified, and respective configuration parameters included, in the "create plugin service" request message and instantiated in a similar manner. Thus, the first SPA instance 216a is able to utilize the data service instance 162e as a "composable" data layer, with a selected composition of plugins instantiated for use by the first SPA instance 216a. The plugin service 240a is also configured to provide a set of code components that notify plugins instantiated for the plugin service of the receipt of new data plugin request messages. The plugin service 240a is also configured to provide a set of code components that receive and transfer data generated by data plugins as a result of processing data plugin request messages. These two sets of components are schematically illustrated as a first request bus 242a.

In some implementations, as shown in FIG. 2, an export plugin component (which may be referred to as an "export plugin" or an "aggregator plugin") is instantiated for each plugin service, such as a first export plugin 244a associated with the first plugin service 240a. The export plugin 244a is configured to provide data generated by some or all of the data plugins to the plugin service 240a for transmission to the first SPA instance 216a via the network connection 230. In some examples, the export plugin 244a is configured to provide such data to the plugin service 240a for only selected data plugins, and to select data plugins based on identification or whitelisted and/or blacklisted data plugins. For example, the whitelisted and/or blacklisted data plugins may be included as configuration parameters in a create plugin" plugin service request message for the export plugin 244a, or the export plugin 244a may implement one or more actions for dynamically whitelisting and/or blacklisting specified data plugins. In some implementations, some or all of the features described for the export plugin 244a may instead be implemented by the plugin service 240a.

A data plugin component may be configured to do one or more of the following:

- Perform an action (for example, by executing a portion of the data plugin component) by performing a transaction with a computer-implemented service (such as service 260a in FIG. 2) via a data source component (such as data source 252a, which is configured to interact with service 260a), in response to a data plugin request message identifying the action.
- Utilize one or more data source components, each configured to interact with one or more computer-implemented services. In some examples, the data plugin causes the data source components to be instantiated for the data plugin; for example, as part of an initialization phase for the data plugin.
- Output one or more data portions as a result of performing an action in response to a data plugin request message identifying the action. In some examples, an output data portion simply indicates that an action has been performed. Such data portions may be transmitted to a client device as being in response to the data plugin request message.
- Indicate when the data plugin component has completed all the actions associated with the data plugin component in a pending data plugin request message.
- Perform an action in response to another data plugin outputting a data portion. In some examples, the action may be performed based on a content of the data portion.
- Output one or more data portions as a result of performing an action in response to another data plugin outputting a data portion. The output data portions may be transmitted to a client device as not being in response to a pending data plugin request message.
- Not utilize any data source components, and accordingly not perform transactions with a computer-implemented service.
- Output one or more data portions in response to a service-initiated event indicated by a data source for a service and not corresponding to a pending data plugin request message. For example, while there is not a pending transaction with an email service, the email service asynchronously reports a new email has just been received.
- Output one or more data portions in response to a cache-initiated event indicated by a data source. For example, a data source may be subscribed to cache key value and receive an asynchronous report that a new value has been stored for the cache key value.
- Output one or more data portions in response to some other event detected by the data plugin. The output data portions may be transmitted to a client device as not being in response to a pending data plugin request message. For example, the data plugin outputs a data portion in response to a timer expiring.

A data source component is configured to interface with a data plugin component and enable the data plugin component to interact with a computer-implemented service (such as the service 260a). The data source component is configured to interact with the service according to data formatting and protocol requirements for the service. In some examples, the data source component is configured to authenticate with the service. In some implementations, there is a defined interface for interaction between data plugin components and data source components, facilitating reuse of a data source component across different data plugin components and/or replacing a data source component with a different data source component.

In some examples, a data source component is configured to utilize a portion of the cache 274. For example, the data source component may be configured to use the cache 174 to accelerate a data request operation (for example, a data request from a data plugin and/or requesting data from a service) by determining whether the cache 174 has unexpired cachable data stored in association with a key value. If there is, the data source component retrieves the stored cachable data. If not, the data source component performs a transaction with a service (for example, requests data from the service), obtains cacheable data based on the transaction (which may include data generated based on data received from the service as a response to the transaction), and stores the obtained cachable data in association with the key value in the cache 174. As a result, the data request operation can later be performed with significantly lower latency.

In the example shown in FIG. 2, a first data plugin component 250a has been instantiated for the first SPA instance 216a. The first data plugin 250a is configured to utilize, and in some examples instantiate, a first data source component 252a for performing transactions with an associated first computer-implemented service 260a. The association with service 260a is illustrated by the "S1" symbol in FIG. 2. Additionally, the first data source 252a is configured to utilize a first portion 270a of the cache 174. In some implementations, the portion 270a is part of a partition of the cache, such as a partition associated with the user 102n. In some examples, the portion 270a corresponds to one or more key value used by the first data source 252a to store and/or retrieve cacheable data with the cache 174. The association with cache portion 270a is illustrated by the "C1" symbol in FIG. 2. There is also a second data plugin 250b, with similar associations with the plugin service 240a, data source 252b, service 260b (shown by "S2" symbol), and a second portion of the cache 174 (shown by "C2" symbol). The services 260a, 260b, 260c, and 260d shown in FIG. 2 may each be a respective one of services 170 or external services 180 in FIG. 1.

Figure 3:
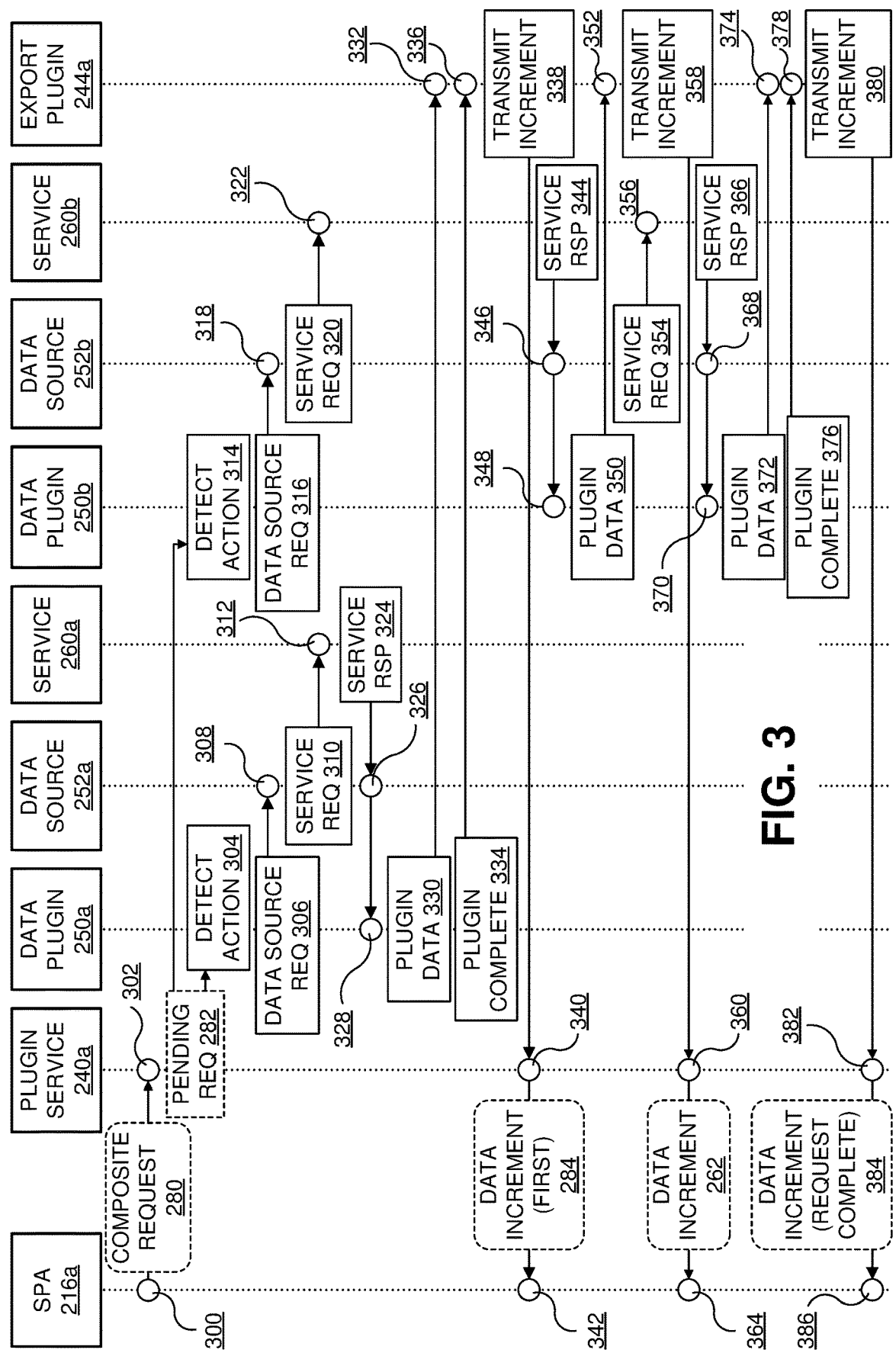
FIG. 3 illustrates an example in which the data service instance shown in FIG. 2 processes a composite request received from the first SPA instance.

In some implementations, as shown in the figures, the data service instance 162e is configured to receive and process composite data plugin request messages (which may be referred to as "composite requests"), such as a composite request 280 shown in FIGS. 2 and 3. A composite request identifies multiple actions to be performed by a total of one or more associated data plugins, in which one or more actions are identified for each of the associated data plugins. In some examples, a composite request identifies actions to be performed by a total of two or more data plugins. In some examples, a composite request identifies a first action and a second dependent action that is automatically performed by the data service instance 162e based on data obtained as a result of performing the first action, resulting in a "chained" request. In some implementations, a composite request includes a key/value dictionary, including keys and/or values identifying each action. In some examples, the key/value dictionary includes data for an action to be used by its associated data plugin for executing an action (which may be referred to as "action data" or "action parameters").

FIG. 3 illustrates an example in which the data service instance 162e shown in FIG. 2 processes a composite request 280 received from the first SPA instance 216a. At operation 300, the first SPA instance 216a generates the composite request 280 and transmits the composite request 280 via the network connection 230 to the data service instance 162e. As a result, at operation 302 the composite request 280 is routed to the plugin service 240a by the data connection controller 234. In response to receiving the composite request 280, the plugin service 240a begins a new composite response lifecycle, with a pending request 282 for the composite request 280 that is used to manage the composite response lifecycle. In some implementations, the data plugins 250a and 250b subscribe to the plugin service 240a to receive notifications of new pending requests.

In this example, the composite request 280 identifies a first action associated with the first data plugin 250a and a second action associated with the second data plugin 250b. At operation 304, the first data plugin 250a detects the first action of the pending request 282 as being associated with the first data plugin 250a. In response to this detection of the first action in the pending request 282, the first data plugin 250a performs the first action, resulting in the first data plugin 250a issuing a data source request 306 to a data source 252a associated with the data plugin 250a, indicating a transaction to be performed by the data source 252a. At operation 308, the data source 252a, in response to receiving the data source request 306, issues a corresponding service request 310 to the service 260a, to perform a first transaction with the service 260a, associated with the data source 252a. At operation 312, the service 260a receives the first transaction, which will eventually result in a service response 324 indicating the first transaction has been completed. At operations 314, 318, and 322, a similar series of operations are performed with respect to the second action of the pending request 282, which will eventually result in a service response 344 from the service 260b indicating a second transaction for a service request 320 has been completed.

At operation 326, the data source 252a receives the service response 324 (or otherwise determines the first transaction with the service 260a has been completed) and indicates to the data plugin 250a that the data source request 306 has been completed. In some examples, the data plugin 250a provides a data based on the first transaction; for example, the data might indicate the first transaction completed, or might be generated based on data received from the service 260a in the service response 324. At operation 328, in response to the data source 252a completing the data source request 306, the data plugin 250a outputs plugin data 330. Additionally, in response to determining that all of the actions of the pending request 282 that are associated with the first data plugin 250a (in this example, the first action) have been performed, the first data plugin 250a generates a plugin complete indication 334. In some examples, the plugin complete indication 334 is provided with the plugin data 330.

At operation 332, the export plugin 244a obtains the plugin data 330, and at operation 336 determines that the first data plugin 250a has performed all of its actions associated with the pending request 282. Also, at operation 332, the export plugin 244a determines the plugin data 330 is to be transmitted to the first SPA 216a in response to the pending request 282, and at operation 338 causes the data increment including the plugin data 330 to be transmitted. For example, the export plugin 244a may execute a "transmit data increment" method provided by the plugin service 240a. In some implementations, the export plugin 244a may collect data from multiple plugin data items such as the plugin data 330, depending on the timing of when the plugin data is provided. For example, the export plugin 244a may be configured to cause a data increment to be transmitted in response to a timer event, such as, but not limited to, within 50 milliseconds of receiving a first plugin data, such as plugin data 330, included in the data increment. At operation 340, the plugin service 240a, in response to the operation 338, invokes a method on the data connection controller 234 that causes a data increment message 284 to be transmitted via the network connection 230 to the first SPA instance 216a. As this is the first data increment message transmitted in response to the pending request 282, which may be indicated by the export plugin 244a at operation 338, the data increment message 284 may include a "first message" indication. At operation 342, the first SPA instance 216a responds to the data increment message 284; for example, the first SPA instance 216a may be configured to automatically update a model based on the data increment message 284 and make a corresponding change to the SPA view 222a being presented on the display device 220.

At operation 346, the data source 252b receives the service response 344 (or otherwise determines the second transaction with the service 260b has been completed) and provides corresponding data to the data plugin 250b in response to the data source request 316. As a result, much as described for operations 328, 336, 338, and 340, respective operations 348, 352, 358, and 360 cause a second data increment message 362, which includes the plugin data 350 produced based on the service response 344, to be transmitted via the network connection 230 to the first SPA instance 216a. At operation 364, the first SPA instance 216a responds to the second data increment message 362.

In this particular example, at operation 346 the data source 252b has not completed the data source request 316, and the data source 252b performs another transaction, illustrated as a third service request 354, with the data source 252b. The third service request 354 eventually results in a service response 366 from the service 260b indicating the third transaction has been completed. As a result, much as described for operations 326, 328, 332, 338, and 340, respective operations 368, 370, 374, 380, and 382 cause a third data increment message 384 to be transmitted via the first connection 230 to the first SPA instance 386. Much as described for operation 328, at operation 370, in response to determining that all of the actions of the pending request 282 that are associated with the second data plugin 250b (in this example, the second action) have been performed, the second data plugin 250b generates a plugin complete indication 376. In some examples, the plugin complete indication 376 is provided with the plugin data 372. Since all of the data plugins have completed their actions for the pending request 282, the third data increment message 384 will be the last data increment message transmitted in response to the pending request 282, which may be indicated by the export plugin 244a at operation 380 in response to receiving the plugin complete indication 376 at operation 378, the third data increment message 384 may include a "request complete" indication. In some implementations, an additional request complete message may be transmitted to the first SPA instance 216a. At operation 386, the first SPA instance 216a responds to the third data increment message 384. As a result, the first SPA instance 216a may transmit another composite request message (not shown) to the data service instance 162e, beginning another request lifecycle.

Figure 4:
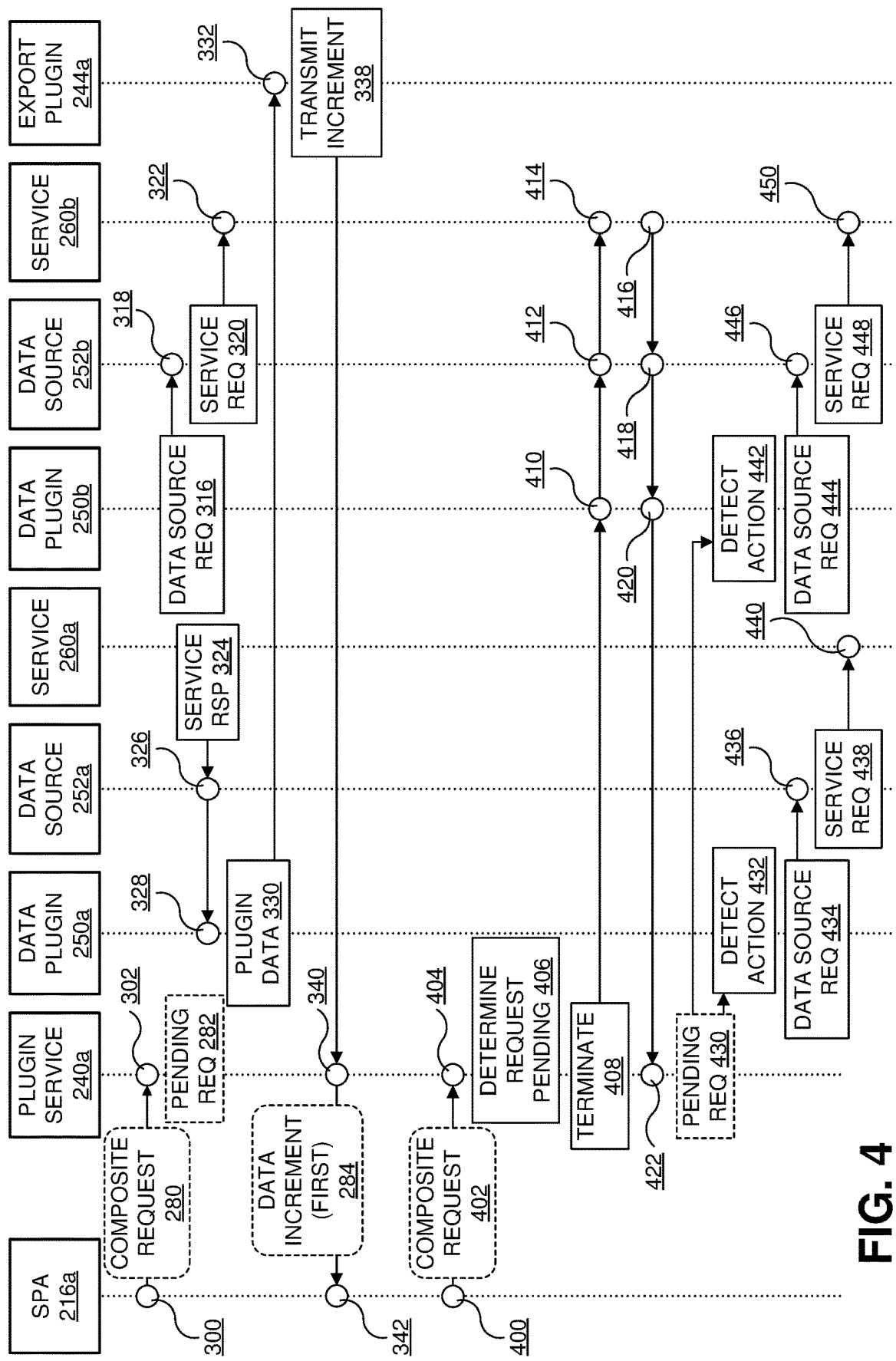
FIG. 4 illustrates an example similar to FIG. 3, but in which pending activities are canceled in response to a new composite request message being received from the first SPA instance while there is a currently pending composite request.

FIG. 4 illustrates an example similar to FIG. 3, but in which pending activities are canceled in response to a new composite request message 402 being received from the first SPA instance while there is a currently pending composite request 282. In this example, the same operations 300, 302, 304, 308, 312, 314, 318, 322, 326, 328, 332, 336, 338, 340, and 342 described in FIG. 3 have been performed. As a result, at operation 342 in FIG. 4, the first action associated with the first data plugin 250a has been fully performed, and a data increment message 284 including plugin data 330 has been transmitted to the first SPA instance 216a. Additionally, the second action of the pending request 282 has not been fully performed, and the service 260b has not completed the second transaction indicated by the service request 320 in FIG. 4.

At operation 400, the first SPA instance 216a generates a second composite request 402 and transmits the second composite request 402 via the network connection 230 to the data service instance 162e while the pending request 282 remains pending and not fully performed. For example, operation 400 may be performed in response to a detected user input (for example, indicating the user 102n wishes to do a different action) or timer expiration (for example, a watchdog timer indicating that the pending request 282 has taken too long to complete).

As a result, as in operation 302, at operation 404 the second composite request 402 is routed to the plugin service 240a. At operation 406, the plugin service 240a determines that when it has received the second composite request 402, the previous pending request 282 for the composite request 280 remains pending. In some implementations, as illustrated in FIG. 4, the plugin service 240a is configured to, in response to receiving a new composite request while a current pending request is still pending, terminate the current pending request and any related pending actions and service transactions. Accordingly, at operation 408, in response to the determination at operation 406 that the pending request 282 is still pending, the plugin service 250a instructs the data plugins with actions of the pending request 282 that have not been fully performed to terminate actions associated with the pending request 282. At that time only the second data plugin 250b has not fully performed its actions. At operation 410, the second data plugin 250b, in response to the operation 408, instructs the data source 252b to terminate the data source request 316 and/or any other activities being performed for the pending request 282. At operation 412, the data source 252b, in response to the instruction issued in operation 410, terminates any activities being performed or scheduled to be performed for the data source request 316 and/or the pending request 282. In this example, the data source 252b instructs the service 260b to terminate the second transaction associated with the incomplete service request 320. At operation 414, the service 260b, in response to the instruction issued in operation 412, terminates the second transaction and/or any other activities being performed or scheduled to be performed for the service request 420, the data source request 316, and/or the pending request 282.

At operation 416, the service 260b notifies the data source 252b that the operation 414 has been or will be performed (for example, the service 260b may acknowledge the instruction issued in operation 412, but complete termination-related activities after operation 416). At operation 418, the data source 252b notifies the second data plugin 250b that the operation 412 has been or will be performed. At operation 420, the second data plugin 250a notifies the plugin service 240a that the operation 410 has been or will be performed. At operation 422, in response to the notification at operation 420 (and other such notifications from other applicable data plugins) the plugin service 250a completes the termination of the current pending request 282. In some implementations, at operation 422, the plugin service 250a may cause a "composite request canceled" message (not shown in FIG. 4) to be transmitted via the network connection 230 to the first SPA instance 216a. The first SPA instance 216a may be configured to update a model to reflect the cancellation of the first pending request 282 for the composite request 280 before all actions indicated in the composite request 280 have completed.

In response to receiving the second composite request 402 and the completion of the termination of the pending request 282 at operation 422, the plugin service 240a begins a new composite response lifecycle, with a second pending request 430 for the second composite request 402 that is used to manage the composite response lifecycle much as described for the previous pending request 282. In this example, the second composite request 402 identifies one or more actions associated with the first data plugin 250a and one or more actions associated with the second data plugin 250b. As a result, operations 432, 436, 440, 442, 446, and 450 are performed much as previously described for respective operations 304, 308, 312, 314, 318, and 322 in FIG. 3.

Figure 5:
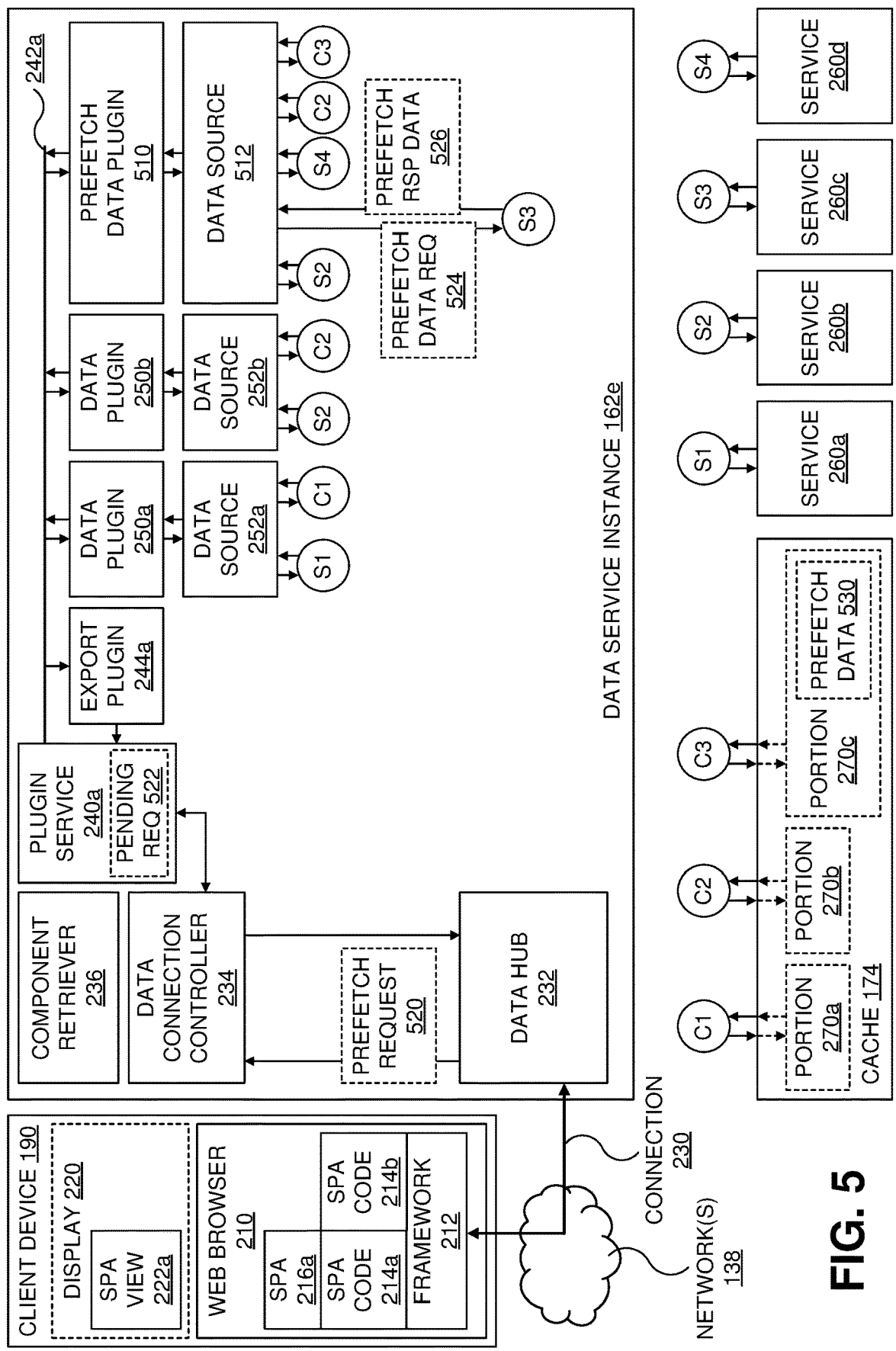
FIG. 5 illustrates an example in which the first SPA instance and the data service instance perform activities relating to prefetching code and data for a different SPA.

FIG. 5 illustrates an example in which the first SPA instance 216a and the data service instance 162e perform activities relating to prefetching code and data for a different SPA (referred to as the "second SPA"). In this example, prefetching for a selected SPA is initiated by the first SPA instance 216a. For example, the first SPA instance 216a may be configured to identify SPA applications that have been recently or frequently used by the user 102n, and initiate prefetching for the second SPA via the framework 212. In some implementations, in response to a request for the first SPA instance 216a to perform prefetching for the second SPA, the framework 212 retrieves second SPA code 214b, which is configured to create an instance of the second SPA. Additionally, the first SPA instance 216a and/or the framework 212 transmits a prefetch request message 520 via the network connect 230, resulting in a new pending request 522 including a prefetch action associated with a prefetch data plugin 510 (which may be referred to as a "prefetch plugin"). The prefetch data plugin 510 may be instantiated dynamically.

Figure 6:
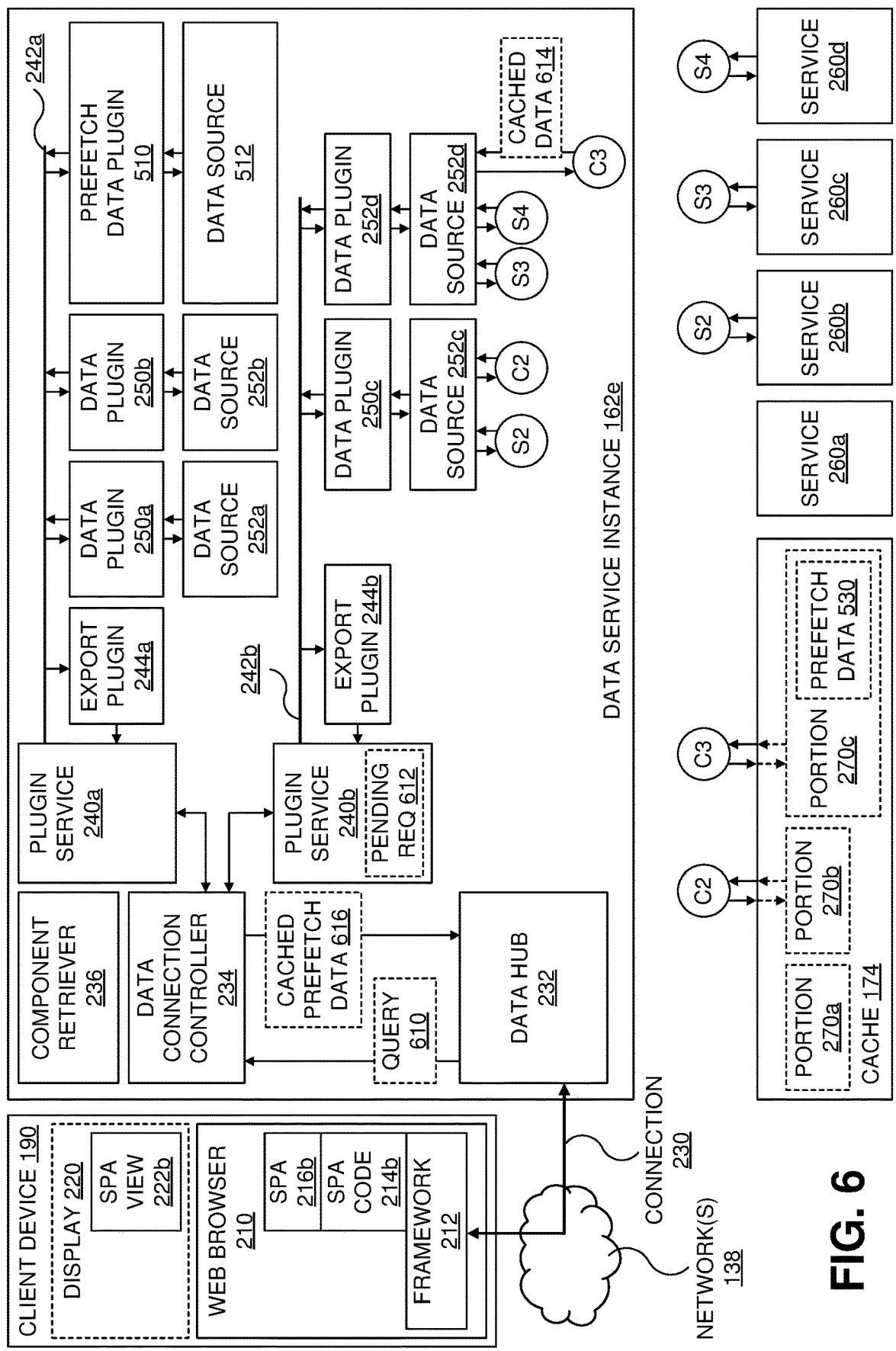
FIG. 6 illustrates an example in which the client device has transitioned from executing the first SPA instance, as shown in FIGS. 2-5, to executing a different second SPA instance, while continuing to maintain the same network connection originally established for the first SPA instance.

The prefetch data plugin makes use of a data source 512 configured to interact with services 260b, 260c, and 260d, and cache portions 270b and 270c, which are also used by instances of the second SPA, as shown in FIG. 6. In some examples, the prefetch data plugin 510 may use multiple data sources; for example, two data sources might be used, divided much like the data sources 252c and 252d shown in FIG. 6. In response to the prefetch action of the pending request 522, the data source 512 performs one or more transactions with the service 260c, illustrated as a prefetch data service request 524, to obtain prefetch response data 526 from the service 260c. For example, "last known good" (LKG) data may be retrieved from the service 260c. In some examples, the prefetch data service request 524 is not performed if a prefetch data 530 is present in a portion 270c of the cache 174 and the prefetch data 530 has not expired. The data source 512 is configured to obtain a cachable prefetch data 530 based on the prefetch response data 526 received from the service 260c. The obtained cachable prefetch data 530 is stored in the portion 270c of the cache 174; for example, in association with one or more key values associated with the portion 270c. As a result of these operations, the prefetch request message 520 results in portions of the cache 174 associated with the second SPA (such as portion 270b and/or 270c) being "primed" with fresh data, increasing the likelihood of cache hits that will accelerate an initialization phase of the second SPA.

FIG. 6 illustrates an example in which the client device 190 has transitioned from executing the first SPA instance 216a, as shown in FIGS. 2-5, to executing a different second SPA instance 216b, while continuing to maintain the same network connection 230 originally established for the first SPA instance 216a. In the example shown in FIG. 6, cacheable prefetch data 530 is present in the portion 270c of the cache 174, much as described in connection with FIG. 5. In FIG. 6, the first SPA instance 216a has been uninstantiated, the first SPA code 214b has been unloaded, and the second SPA instance 216b has been created using the second SPA code 214b. Some aspects of that process are described in connection with FIG. 7. Much as the instantiation and use of plugin service 240a, export plugin 244a, data plugins 250a and 250b, and data sources 252a and 252b for the first SPA instance 216a are described in FIG. 2, plugin service 240b, export plugin 244b, data plugins 250c and 250d, and data sources 252c and 252b are instantiated and used for the second SPA instance 216b. In FIG. 6, the second SPA instance 216b is in an initialization phase, and has transmitted a composite request 610 via the network connection 230 to retrieve data obtained from associated computer-implemented services (for example, services 260b, 260c, and/or 260d) for rendering an initial second SPA view 222b on the display device 220. Much as described in connection with FIG. 3, the plugin service 240b begins a response lifecycle for a pending request 612 for the composite request 610. The pending request 612 includes an action associated with the data plugin 252d, and in performing that action, the data source 252b retrieves cached data 614 included in the prefetch data 530, resulting in a data increment 616 including data based on the cached data 614.

In some implementations, to transition from the first SPA instance 216a to the second SPA instance 216b, the framework 212 unloads the first SPA instance 216a, then executes pre-rendering portions of the second SPA code 214b which instantiates the second SPA instance 216b, then disposes of the first SPA instance 216a and its associated first SPA code 214a (which eliminates the first SPA view 222a), and then executes rendering portions of the second SPA code 214b, resulting in the second SPA instance 216b providing a second SPA view 222b on the display device 220. Since the first SPA instance 216a and the second SPA instance 216b share the same persistent connection 230, loading of the second SPA instance 216b is significantly faster than would occur via a conventional full page load, because script components, such as the framework 212 and the second SPA code 214b, are already available and the cached data 614 arrives with minimal overhead from the cache 174 over the pre-established connection 230.

Figure 7:
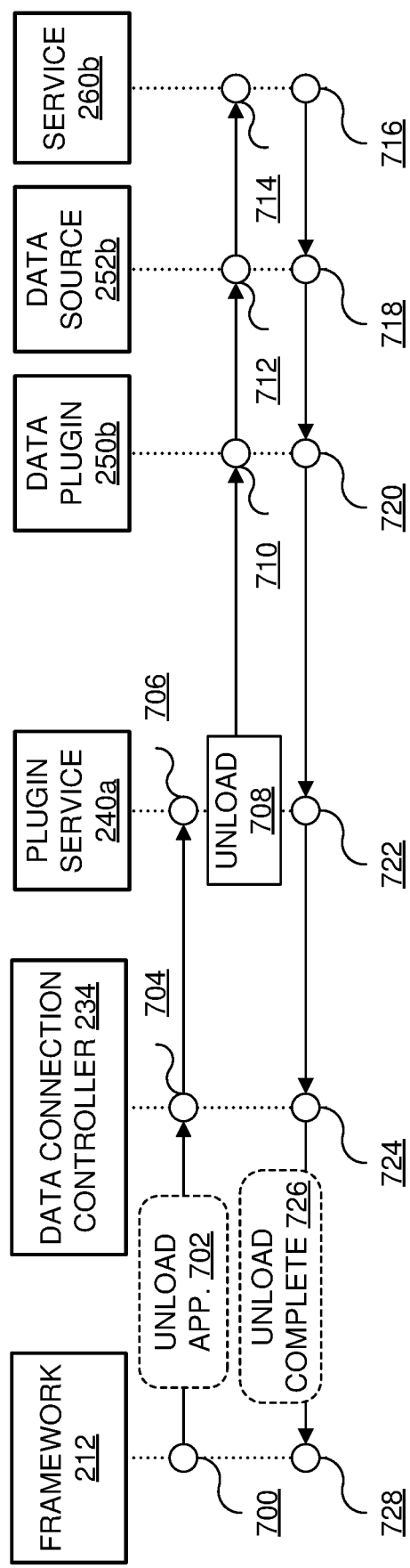
FIG. 7 illustrates examples of operations performed between and within the framework and the data service instance for unloading the first SPA instance.

FIG. 7 illustrates examples of operations performed between and within the framework 212 and the data service instance 162e for unloading the first SPA instance 216a. Operations 700 through 726 relate to operations performed for unloading the first SPA instance 216a. As part of an application unloading process performed by the framework 212, at operation 700 the framework 212 transmits an unload application plugin service management message 702 (which may be referred to as an "unload application message"). At operation 704, the data connection controller 234 instructs the plugin service 240a to perform an unload operation. At operation 706, the plugin service 240a for the first SPA instance 216a initiates the requested unload operation, which includes issuing an unload command 708 to the data plugins. If there is a pending request, such as the pending request 282, that is still pending, the unload command 708 will terminate the pending request much as shown and described in FIG. 4. In this regard, the operations 710, 712, 714, 716, 718, and 720 are similar to the respective operations 410, 412, 414, 416, 418, and 420 in FIG. 4. However, in response to the unload command 708 being received by the data plugin 250b at operation 710, additional activities may be performed by operations 710, 712, and 714. For example, at operation 712 the data source 252b may close a session established with the service 260b that would not be closed by the operation 412. At operation 722, the plugin service 240a completes the unload operation started at operation 706. In response to the operation 722 completing, at operation 724 transmits an unload complete message 726 via the network connection 230 to the framework 230. At operation 728, in response to receiving the unload complete message 726, the framework 212 continues unloading the first SPA instance 216a.

The detailed examples of systems, devices, and techniques described in connection with FIGS. 1-7 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-7 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 8:
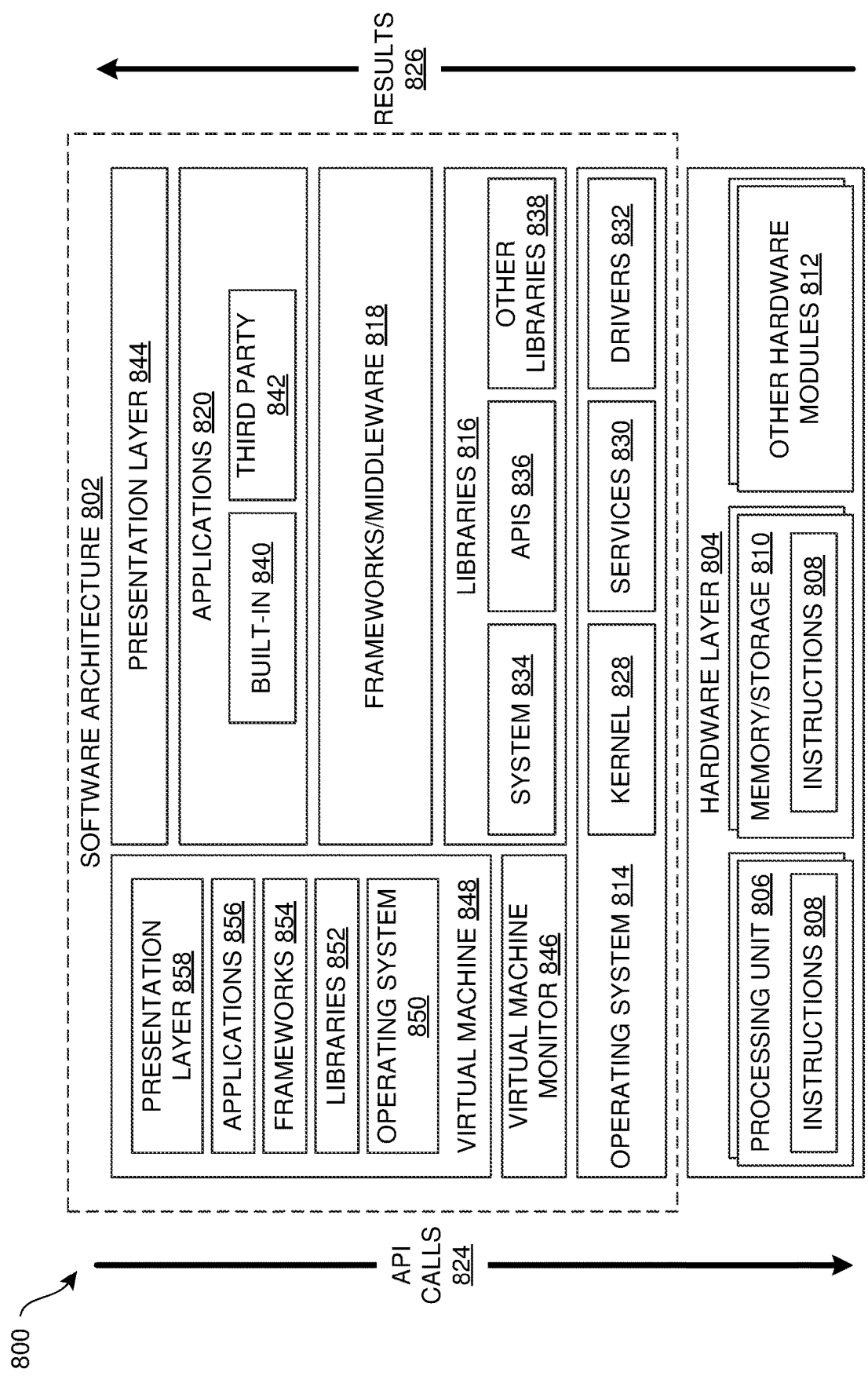
FIG. 8 is a block diagram illustrating an example software architecture, various portions of which may be used in conjunction with various hardware architectures herein described.

FIG. 8 is a block diagram 800 illustrating an example software architecture 802, various portions of which may be used in conjunction with various hardware architectures herein described, which may implement any of the above-described features. FIG. 8 is a non-limiting example of a software architecture and it will be appreciated that many other architectures may be implemented to facilitate the functionality described herein. The software architecture 802 may execute on hardware such as client devices 110, 120, 103, and 190, native application provider 134, web servers 140a and 140b, server cluster 150, external services 180, and server 182 in FIG. 1. A representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 808 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 824. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 820 and/or third-party applications 822. Examples of built-in applications 820 may include, but are not limited to, a contacts application, a browser application, a location application, a media application, a messaging application, and/or a game application. Third-party applications 822 may include any applications developed by an entity other than the vendor of the particular platform. The applications 820 may use functions available via OS 814, libraries 816, frameworks 818, and presentation layer 824 to create user interfaces to interact with users.

Some software architectures use virtual machines, as illustrated by a virtual machine 828. The virtual machine 828 provides an execution environment where applications/modules can execute as if they were executing on a hardware machine (such as the machine 900 of FIG. 9, for example). The virtual machine 828 may be hosted by a host OS (for example, OS 814) or hypervisor, and may have a virtual machine monitor 826 which manages operation of the virtual machine 828 and interoperation with the host operating system. A software architecture, which may be different from software architecture 802 outside of the virtual machine, executes within the virtual machine 828 such as an OS 850, libraries 852, frameworks 854, applications 856, and/or a presentation layer 858.

Figure 9:
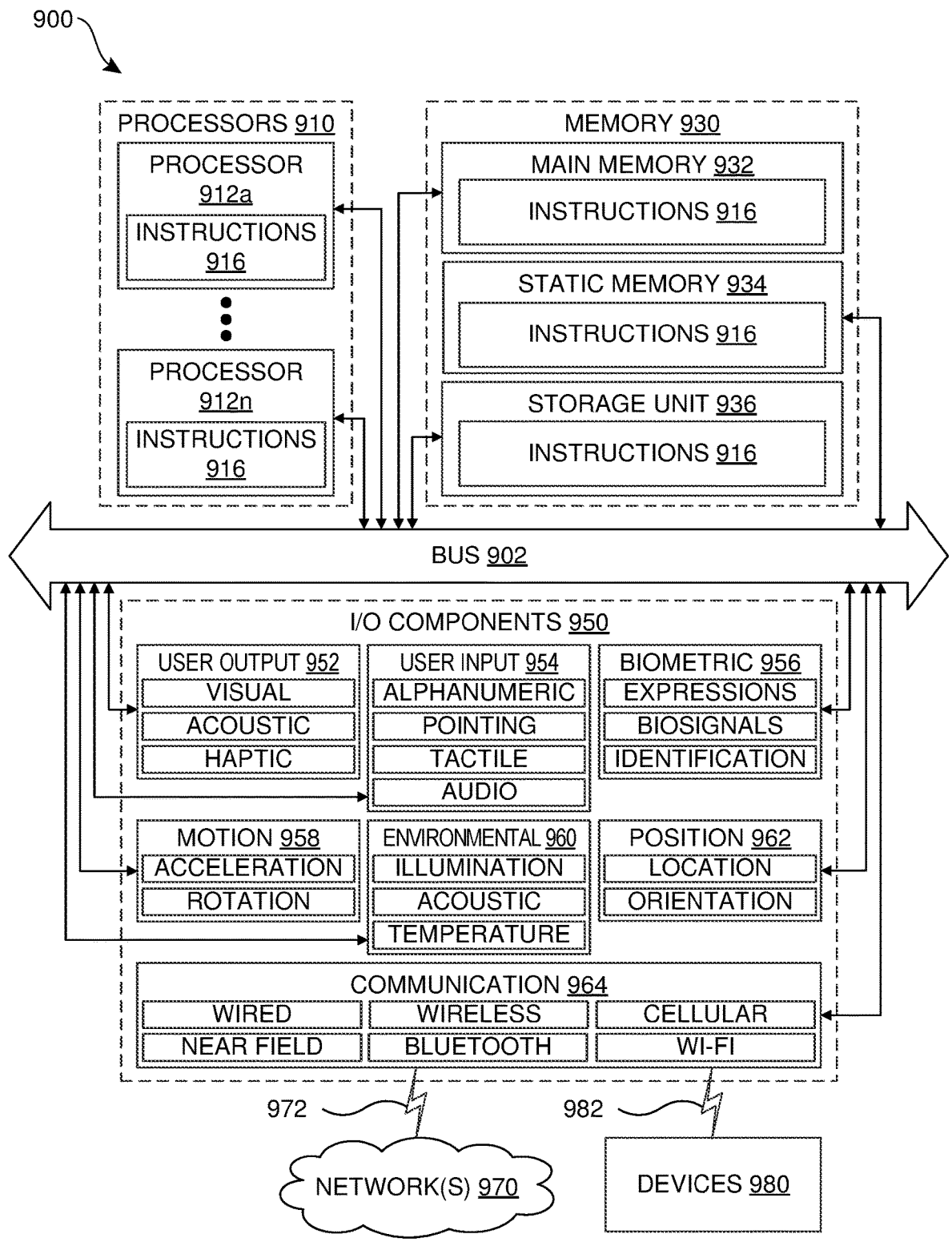
FIG. 9 is a block diagram illustrating components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors $912a$ to $912n$ that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956 and/or position components 962, among a wide array of other environmental sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A computer device for interacting with one or more remote client devices, the computer device comprising: one or more processors; and one or more machine-readable media storing instructions which, when executed by the one or more processors, cause the one or more processors to:
   establish a first WebSocket connection with a first client device,
   identify, for a first single-page application, a first plurality of data plugin components each configured to provide access to one or more computer-implemented services,
   receive, from the first client device, via the first WebSocket connection, a first composite request comprising first data on which a first action is performed by a first data plugin component, and second data on which a second action is performed by a second data plugin component, wherein the first and second plugin components are executed by the computer device,
   execute, using a first computer-implemented service on the computer device, a portion of the first data plugin component to perform a first transaction, based on the first data,
   obtain, based on the first transaction, a first response data,
   transmit, in a first transmission and in response to the first composite request, the first response data to the first client device via the first WebSocket connection,
   execute, using a second computer implemented service on the computer device, a portion of the second data plugin component to perform a second transaction based on the second data,
   obtain, based on the second transaction, a second response data, and
   transmit, in a second transmission and in response to the first composite request, the second response data to the first client device via the first WebSocket connection, wherein the second computer-implemented service is different than the first computer-implemented service, wherein:
   the instructions for performing the first action cause the one or more processors to receive first service-provided response data from the first transaction, obtain a first cacheable data based on the first service-provided response data, and store the first cacheable data in association with a first key value in a cache;
   the first response data is obtained based on first service-provided response data; and the instructions further cause the one or more processors to:
   receive, after the second transmission, a second composite request from a second client device, the second composite request identifying a third action associated with a third data plugin component,
   in response to determining that the second composite request identifies the third action, perform the third action by executing a portion of the third data plugin component to:
   retrieve from the cache, using the first key value, the stored first cacheable data, and
   obtain third response data based on the retrieved first cacheable data, and transmit, in a third transmission and in response to the second composite request, the third response data to the second client device.

2. The computer device of claim 1, wherein the instructions further cause the one or more processors to:
   in response to determining that the second composite request identifies the third action, initiate performance of the third action by executing a portion of the third data plugin component to initiate a third transaction with a first computer-implemented service;
   receive a third composite request from the first client device via the first WebSocket connection while the third transaction is pending, the third composite request identifying a fourth action associated with a fourth data plugin component;
   abort the third transaction in response to the receiving of the third composite request and a determination that the third transaction remains pending;
   in response to determining that the third composite request identifies the fourth action, perform the fourth action by executing a portion of the fourth data plugin component to obtain a third response data; and
   transmit, in a third transmission and in response to the third composite request, the third response data to the first client device via the first WebSocket connection.

3. The computer device of claim 1, wherein the instructions further cause the one or more processors to:
   in response to determining that the second composite request identifies the third action, initiate performance of the third action by executing a portion of the third data plugin component to initiate a third transaction with a first computer-implemented service;
   receive, from the first client device via the first WebSocket connection and while the third transaction is pending, an indication of a suspension or termination of use of the first WebSocket connection by a first single-page application instance; and
   abort the third transaction in response to the receiving of the indication and a determination that the third transaction remains pending.

4. The computer device of claim 3, wherein the instructions further cause the one or more processors to:
   identify, for a second single-page application executing on the first client device, a second plurality of data plugin components each configured to provide access to one or more computer-implemented services, wherein the second single-page application is different than the first single-page application, and the second plurality of data plugin components includes the third data plugin component not included in the first plurality of data plugin components;
   instantiate, after the transmitting of the second transmission, an instance of the third data plugin component;
   in response to determining that the second composite request identifies the third action, perform the third action by executing a portion of the third data plugin component, via the instance of the third data plugin component, to obtain the third response data; and transmit, in a third transmission separate from the first transmission and the second transmission, the third response data to the first client device via the first WebSocket connection.

5. The computer device of claim 1, wherein the second transmission includes a response complete indication.

6. The computer device of claim 4, wherein the instructions further cause the one or more processors to:
establish a second WebSocket connection with the second client device, wherein the second WebSocket connection is different than the first WebSocket connection, wherein:
The third response data is transmitted to the second client device via the second WebSocket connection.

7. The computer device of claim 6, wherein the instructions further cause the one or more processors to:
serve, to the first client device from a first domain with respect to the first client device, first single-page application resources for executing a first single-page application instance; and serve, to the second client device from a second domain with respect to the second client device, second single-page application resources for executing a second single-page application instance, wherein the second domain is different than the first domain.

8. The computer device of claim 3, wherein the instructions further cause the one or more processors to:
identify a prefetch data plugin component configured to perform a prefetch action for a second single-page application, wherein the second single-page application is different than the first single-page application;
receive a second request from an instance of the first single-page application executing on the first client device via the first WebSocket connection, the first request identifying the prefetch action;
in response to determining that the second request includes the prefetch action, perform the prefetch action by executing a portion of the prefetch data plugin component to:
perform a third transaction with a third computer-implemented service,
obtain the first cacheable data based on the third transaction, and storing the first cacheable data in association with a first key value in a cache;
identify, for the second single-page application, a second plurality of data plugin components each configured to provide access to one or more computer-implemented services, wherein the second plurality of data plugin components includes the third data plugin component different than the prefetch data plugin component;
receive, after the storing of the first cacheable data, a third composite request from an instance of the second single-page application executing on the first client device via the first WebSocket connection, the third composite request identifying a second plurality of actions, including a third action associated with the third data plugin component;
in response to determining that the third composite request identifies the third action, perform the third action by executing a portion of the third data plugin component to:
retrieve from the cache, using the first key value, the stored first cacheable data, and obtain third response data based on the retrieved first cacheable data; and
transmit, in a third transmission and in response to the third composite request, the third response data to instance of the second single-page application executing on the first client device via the first WebSocket connection.

9. The computer device of claim 1, wherein: the first plurality of data plugin components includes the third data plugin component different from the first data plugin component and the second data plugin component; the instructions for performing the first action cause the one or more processors to:
obtain a third response data from the third data plugin component by causing the third data plugin component to perform a third action, and
perform the first transaction based on the third response data obtained from the third data plugin component; and the instructions for performing the third action cause the one or more processors to:
execute a portion of the third data plugin component to perform a fourth transaction with a third computer-implemented service, and
obtain the third response data based on the fourth transaction.

10. A method implemented in a computer device for interacting with one or more remote client devices, the method comprising:
establishing a first WebSocket connection with a first client device;
identifying a first plurality of data plugin components each configured to provide access to one or more computer-implemented services;
receiving, from the first client device, via the first WebSocket connection, a first composite request comprising first data on which a first action is performed by a first data plugin component, and second data on which a second action is performed by a second data plugin component, wherein the first and second plugin components are executed by the computer device;
executing, using a first computer implemented service on the computer device, a portion of the first data plugin component to perform a first transaction, based on the first data;
obtaining, based on the first transaction, a first response data;
transmitting, in a first transmission and in response to the first composite request, the first response data to the first client device via the first WebSocket connection,
executing, using a second computer-implemented service on the computer device, a portion of the second data plugin component to perform a second transaction, based on the second data;
obtaining, based on the second transaction, a second response data; and
transmitting, in a second transmission and in response to the first composite request, the second response data to the first client device via the first WebSocket connection, wherein the second computer-implemented service is different than the first computer-implemented service;
wherein the performing the first action includes receiving first service-provided response data from the first transaction, obtaining a first cacheable data based on the first service-provided response data, and storing the first cacheable data in association with a first key value in a cache, wherein the first response data is obtained based on first service-provided response data, and wherein the method further comprises:
receiving, after the second transmission, a second composite request from a second client device, the second composite request identifying a third action associated with a third data plugin component; and in response to determining that the second composite request identifies the third action, performing the third action by executing a portion of the third data plugin component to:

retrieve from the cache, using the first key value, the stored first cacheable data, and obtain third response data based on the retrieved first cacheable data, and transmitting, in a third transmission and in response to the second composite request, the third response data to the second client device.

11. The method of claim 10, further comprising:

in response to determining that the second composite request identifies the third action, initiating performance of the third action by executing a portion of the third data plugin component to initiate a third transaction with a first computer-implemented service;

receiving a third composite request from the first client device via the first WebSocket connection while the third transaction is pending, the third composite request identifying a fourth action associated with a fourth data plugin component;

aborting the third transaction in response to the receiving of the third composite request and a determination that the third transaction remains pending;

in response to determining that the third composite request identifies the fourth action, performing the fourth action by executing a portion of the fourth data plugin component to obtain a third response data; and transmitting, in a third transmission and in response to the third composite request, the third response data to the first client device via the first WebSocket connection.

12. The method of claim 10, further comprising:

in response to determining that the second composite request identifies the third action, initiating performance of the third action by executing a portion of the third data plugin component to initiate a third transaction with a first computer-implemented service;

receiving, from the first client device via the first WebSocket connection and while the third transaction is pending, an indication of a suspension or termination of use of the first WebSocket connection by a first single-page application instance; and aborting the third transaction in response to the receiving of the indication and a determination that the third transaction remains pending.

13. The method of claim 12, further comprising:

identifying, for a second single-page application executing on the first client device, a second plurality of data plugin components each configured to provide access to one or more computer-implemented services, wherein the second single-page application is different than the first single-page application, and the second plurality of data plugin components includes a third data plugin component not included in the first plurality of data plugin components;

instantiating, after the transmitting of the second transmission, an instance of the third data plugin component;

in response to determining that the second composite request identifies the third action, performing the third action by executing a portion of the third data plugin component, via the instance of the third data plugin component, to obtain a first response data; and transmitting, in a third transmission separate from the first transmission and the second transmission, the third response data to the first client device via the first WebSocket connection.

14. The method of claim 10, wherein the second transmission includes a response complete indication.

15. The method of claim 12, further comprising:

establishing a second WebSocket connection with the second client device, wherein the second WebSocket connection is different than the first WebSocket connection, wherein:

the second composite request is received from the second client device via the second WebSocket connection, and the third response data is transmitted to the second client device via the second WebSocket connection.

16. The method of claim 15, further comprising:

serving, to the first client device from a first domain with respect to the first client device, first single-page application resources for executing the first single-page application instance; and serving, to the second client device from a second domain with respect to the second client device, second single-page application resources for executing a second single-page application instance, wherein the second domain is different than the first domain.

17. The method of claim 12, further comprising:

identifying a prefetch data plugin component configured to perform a prefetch action for a second single-page application, wherein the second single-page application is different than the first single-page application;

receiving a second request from an instance of the first single-page application executing on the first client device via the first WebSocket connection, the first request identifying the prefetch action;

in response to determining that the second request includes the prefetch action, performing the prefetch action by executing a portion of the prefetch data plugin component to:

perform a third transaction with a third computer-implemented service, obtain the first cacheable data based on the third transaction, and storing the first cacheable data in association with a first key value in a cache;

identifying, for the second single-page application, a second plurality of data plugin components each configured to provide access to one or more computer-implemented services, wherein the second plurality of data plugin components includes the third data plugin component different than the prefetch data plugin component;

receiving, after the storing of the first cacheable data, a third composite request from an instance of the second single-page application executing on the first client device via the first WebSocket connection, the third composite request identifying a second plurality of actions, including a third action associated with the third data plugin component;

in response to determining that the third composite request identifies the third action, performing the third action by executing a portion of the third data plugin component to:

retrieve from the cache, using the first key value, the stored first cacheable data, and obtain third response data based on the retrieved first cacheable data; and transmitting, in a third transmission and in response to the third composite request, the third response data to instance of the second single-page application executing on the first client device via the first WebSocket connection.

18. The method of claim 10, wherein: the first plurality of data plugin components includes the third data plugin component different from the first data plugin component and the second data plugin component; the performing the first action includes:
- obtaining a third response data from the third data plugin component by causing the third data plugin component to perform a third action, and
- performing the first transaction based on the third response data obtained from the third data plugin component; and the performing the third action includes:
- executing a portion of the third data plugin component to perform a fourth transaction with a third computer-implemented service, and
- obtaining the third response data based on the fourth transaction.

* * * * *